United States Patent [19]

Fuse et al.

[11] Patent Number: 4,542,412

[45] Date of Patent: Sep. 17, 1985

[54] METHOD FOR COMPRESSING CHARACTER OR PICTORIAL IMAGE DATA

[75] Inventors: Shigeru Fuse; Masatake Takashima; Shinichiro Fukuda; Hiroyuki Shibata, all of Toshima, Japan

[73] Assignee: Shaken Co., Ltd., Tokyo, Japan

[21] Appl. No.: 463,111

[22] Filed: Feb. 1, 1983

[30] Foreign Application Priority Data

Feb. 4, 1982 [JP] Japan ................................. 57-16884
Feb. 4, 1982 [JP] Japan ................................. 57-16885
Feb. 4, 1982 [JP] Japan ................................. 57-16886
Feb. 4, 1982 [JP] Japan ................................. 57-16887

[51] Int. Cl.$^4$ ............................................. H04M 7/12
[52] U.S. Cl. ..................................... 358/260; 382/13; 382/56
[58] Field of Search ................... 358/260, 263; 382/56, 382/13, 22

[56] References Cited

U.S. PATENT DOCUMENTS

| 3,996,557 | 12/1976 | Donahey | 382/13 |
| 4,254,468 | 3/1981 | Craig | 364/533 |
| 4,284,975 | 8/1981 | Odaka | 382/13 |
| 4,317,109 | 2/1982 | Odaka et al. | 382/13 |
| 4,361,830 | 11/1982 | Honma et al. | 382/22 |
| 4,365,235 | 12/1982 | Greanias et al. | 382/13 |

Primary Examiner—Michael A. Masinick
Assistant Examiner—Edward L. Coles
Attorney, Agent, or Firm—Sherman and Shalloway

[57] ABSTRACT

A method for compressing character or pictorial image data which contemplates to compress a quantity of data by means of a method for establishing sampling points and a method for establishing blocks as well as storing information for specifying outlines of a character in the case where the outlines of character, pictorial image or the like are approximated with sets of functional curves or straight lines to effect data compression.

9 Claims, 16 Drawing Figures

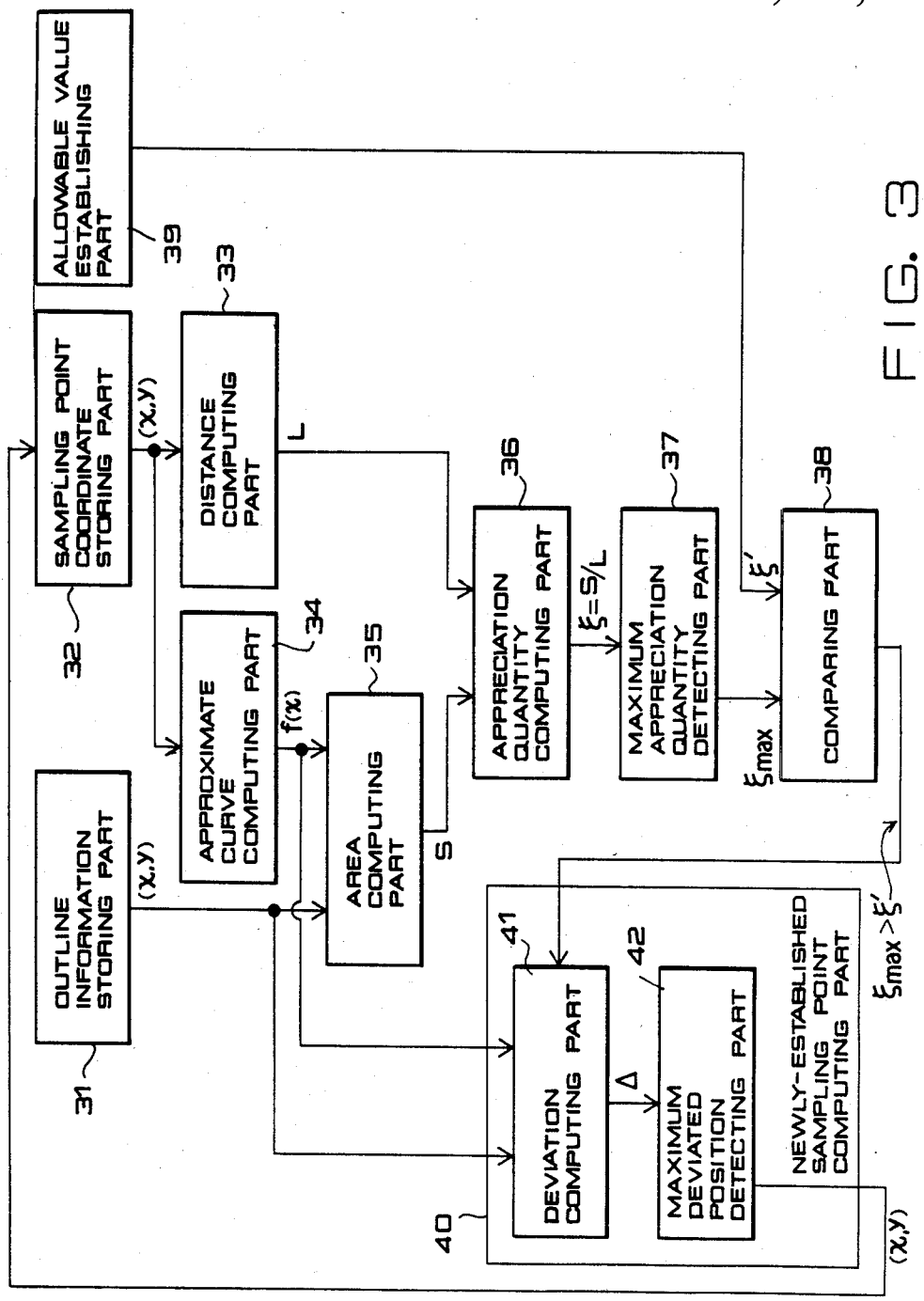

METHOD FOR COMPRESSING CHARACTER OR PICTORIAL IMAGE DATA

BACKGROUND OF THE INVENTION

1. Field of the Invention

This invention relates to a method for compressing character or pictorial image data, and particularly to a data compressing method which contemplates to compress a quantity of data by means of a method for establishing sampling points and a method for establishing blocks as well as storing information for specifying outlines of a character, pictorial image or the like (hereinafter referred to simply as "character") in the case where the outlines of character are approximated with sets of functional curves or straight lines to effect data compression.

2. Description of the Prior Art

First of all, establishment of sampling points will be described hereinbelow. In a method for compressing character data wherein an outline of character is split with sampling points, and each of the outline segments thus split is approximated by means of functional curves or straight lines, it is important to establish a small number of sampling points as less as possible at a high rate within a range where characteristics in a shape of the character outline are not damaged.

Heretofore, as the simplest method for establishing such sampling points, there has been a method for determining sampling points by increasing variable every unit quantity with respect to the character outline developed on X- and Y-coordinates.

However, the establishment of sampling points in such method depends on only variable axis so that a prescribed precision is not guaranteed for a relationship between a curve (or a straight line) to be approximated and an actual character outline, and as a result, it was difficult to establish the most suitable sampling points.

Furthermore, there has been proposed such a method wherein precision between a curve (or a straight line) to be approximated and an actual character outline is determined in respect of candidate sampling points, then, the candidate sampling points are moved in a manner of trial and error in response to the precision determined, and the candidate sampling points are utilized as established sampling points at the time when a prescribed precision was obtained. However, since this method requires a trial and error process for establishing one sampling point, the processing therefor was redundant.

Next, compression of a quantity of data will be described hereinbelow.

It is well known that binary data determined by subjecting a character, pictorial image or the like (hereinafter referred to simply as "character") to dot-decomposition are data which possesses very high redundancy.

In this respect, various data compressing methods have heretofore been proposed for decreasing such redundancy. One example of these methods is a so-called outline method wherein shape of a character is grasped by whose outline, and information for specifying the outline is stored thereby contemplating to compress a quantity of data.

As data compressing methods according to such outline method, a vector approximating method as illustrated in FIG. 8, or an m-order curve approximating method as illustrated in FIG. 9 has already been proposed.

The vector approximating method illustrated in FIG. 8 relates to the ones which have been disclosed in Japanese Patent Laid-open No. 149522/1979 (U.S. Pat. No. 4,254,468) and Japanese Patent Laid-open No. 79154/1980, respectively.

An abstract of such vector approximating method is such that an outline 1 of arbitrary character indicated by a dotted line is approximated with a set of two-dimensional vectors 2, and specified information (position of starting point, length and inclination, or components in horizontal and vertical directions) for the respective vectors is utilized as memory data, whereby whose data compression becomes possible.

Furthermore, the m-order curve approximating method illustrated in FIG. 9 is the one which has been already filed by the present applicant and Japanese Patent Application No. 116,160/1980 was assigned to the application.

The abstract of this m-order curve approximating method is such that compression of a quantity of data is intended by storing coordinates of a group of points P established suitably on the outline of an optional character, and at the same time, it is contemplated to approximate a desired outline by means of a set of m-order curve elements 3 connecting (m+1) of arbitrarily continuous points with one another.

And these data compression methods according to such outline method have such characteristics that when interpolation processing or scale factor conversion processing of vector is carried out in the case where whose compression data are interpreted to reproduce a character image, the methods can cope with reproduction of character images of various scale factors.

On the other hand, however, these conventional data compressing methods in accordance with the outline method involve such an essential disadvantage in that the optimum result is not guaranteed in respect of smoothness of the outline (continuity in inclination of the outline).

More specifically, for instance, either inclination δ of respective left and right segments involving either each terminal outline point P of the vectors in FIG. 8, or each connecting point $P_c$ of the m-order curves 3 in FIG. 9 as its center is inevitably discontinuous.

In this respect, an outline shape of character has generally such a characteristic that not only the outline itself is continuous, but also the primary derived function (inclination of outline) as well as the secondary derived function (rate of change in inclination thereof vary continuously, if peculiar points such as intersecting portions of lines constituting a character, or extreme ends of so-called beaks corresponding to "hane" in Chinese or katakana character are excluded.

For this reason, conventional data compressing methods according to the outline method still contain such a problem that compression data being faithful to character outline cannot be obtained by the methods, besides unnaturalness (discontinuity in inclination) of a character image reproduced on the basis of such data cannot completely be removed.

SUMMARY OF THE INVENTION

A principal object of the present invention is to provide a useful method for compressing character or pictorial image data by which the above-mentioned disadvantages in the conventional methods can be eliminated.

Another object of the present invention is to provide a rational method for establishing sampling points for compressing character data wherein one sampling point is successively established by means of one comparison in precision.

Still another object of the present invention is to provide a method for establishing blocks which contributes to decrease of the number of sampling points to be established in the whole character outline and makes character data compression more effective.

A further object of the invention is to provide a method for compressing character or pictorial image data with a sufficiently high data compressibility by which smoothness of character outline can be faithfully corded and stored in accordance with the improved outline method.

A still further object of the invention is to provide a method for compressing character or pictorial image data which can cope with reproduction of character image having smooth outline of various scale factors in the case when compressed data are interpreted to reproduce the character image.

These and other objects as well as advantages of the present invention will become apparent from the following detailed description and preferred embodiments taken in connection with the accompanying drawings.

BRIEF DESCRIPTION OF THE DRAWINGS

FIG. 3 is a block diagram illustrating an embodiment of the method for establishing sampling points in accordance with the present invention;

DESCRIPTION OF THE PREFERRED EMBODIMENTS

First of all, a pretreatment for character outlines which is a premise of establishing sampling points will be described hereinbelow.

Figure 1:
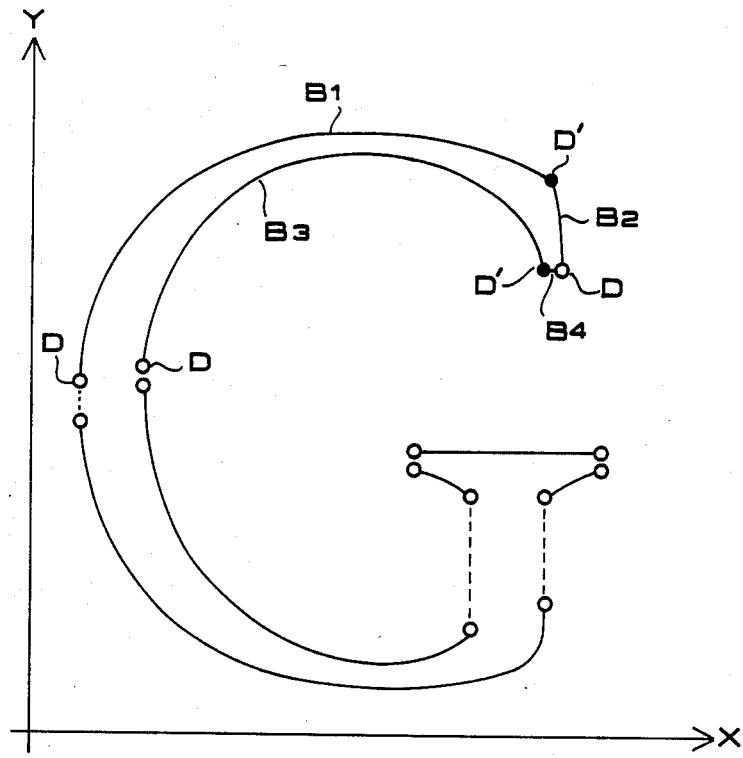
FIG. 1 is a typical explanatory view showing such situation wherein outline of a character is grasped as a set of plural blocks.

FIG. 1 is a typical explanatory view illustrating a situation in which a character outline is split into plural blocks ($B_1$, $B_2$, $B_3$, . . . ), and the character outline is grasped as a set of the respective blocks B wherein mark "o" and mark " • " indicate each terminal outline point in these blocks, respectively.

Namely, as a pretreatment for establishing sampling points, split points are suitably established on the character outline developed on X- and Y-coordinates, and the outline is split in an interval of one valued function involving x as its variable, whereby the blocks have previously been determined.

The splitting of these blocks may generally be processed by establishing an arbitrary interval in which a series of X-coordinate values of the outline increase or decrease monotonously as a block.

Furthermore, as a more suitable block establishing method, there is such a method that, as illustrated in FIG. 1, positions at which a series of X-coordinate values on the outline become extreme values are determined, thereafter, positions corresponding to the aforesaid extreme values are established as initial split points D (mark "o" in FIG. 1), and further, as fully described in conjunction with the undermentioned block establishing method, intervals split with each split point (D or D') are established as blocks B, respectively, by establishing second split points D' (mark " • " in FIG. 1) on the respective outline blocks split with the aforesaid splits points D with a prescribed relationship.

Physical meaning of each block B established as described above is in that each block B corresponds to a set of points making bright points to be scanned in Y-direction turn-on or turn-off in case of reproducing character image on a raster scanning type character display unit such as cathode ray tube (CRT).

The sampling point establishing method according to the present invention relates to the one in which an outline corresponding to any one of the respective blocks B established by means of the above described pretreatment is split into a larger number of outline segments.

Figure 2A:
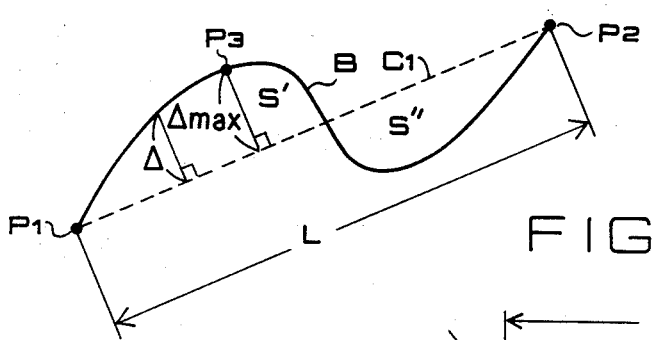
FIGS. 2A-2C are typical explanatory views illustrating processes for establishing sampling points on any one block B based on the method according to the present invention.
Figure 2B:
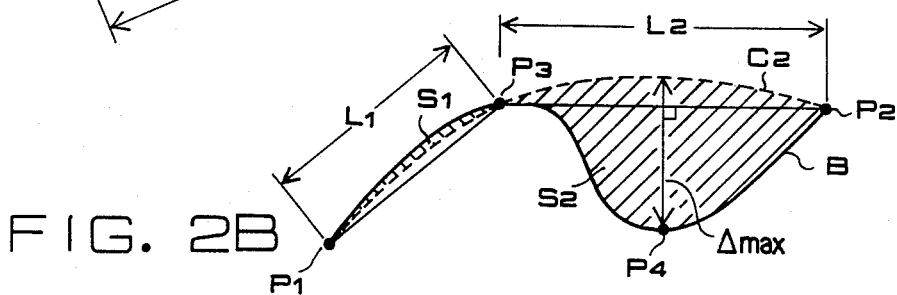
Figure 2C:
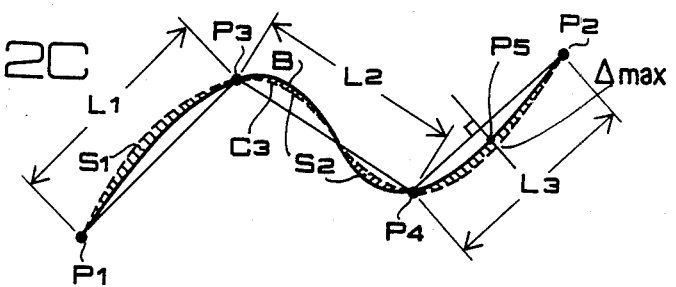

FIGS. 2A-2C are typical explanatory views showing processes for establishing sampling points on any one of the blocks B in accordance with the method of the present invention. FIG. 3 is a block diagram illustrating an embodiment of the sampling point establishing method according to the present invention.

In FIG. 3, reference character 31 designates an outline information storing part for storing coordinate information of the outline corresponding to any one block B represented by a solid line curve in FIG. 2 and outputting such information at need, 32 a sampling point coordinate storing part for successively storing coordinate information of the sampling points established in accordance with the method of the present invention and outputting such information as occasion demands, 33 a distance computing part for computing a distance L between adjacent sampling points, respectively, in respect of the sampling points which have already been established on the outline, that is, which have been stored in the aforesaid sampling point coordinate storing part, 34 an approximate curve computing part which will be described hereunder, 35 an area computing part for computing an area S enclosed by outline segments cut out by adjacent sampling points as well as an approximate curve obtained by connecting the respective sampling points which have already been established on the outline with each other, 36 an appreciation quantity computing part for computing an appreciation quantity $\xi$ being a ratio S/L in respect of each segment on the basis of the distance L computed in the aforesaid distance computing part 33 and the area S determined in the area computing part 35, 37 a maximum appreciation quantity detecting part, 38 a comparing part for comparing magnitude of the maximum value $\xi_{max}$ of the appreciation quantity determined by the appreciation quantity computing part 36 with that of a predetermined allowable value $\xi'$ supplied from an allowable value establishing part 39, and 40 a newly-established sampling point computing part for computing new sampling points on the basis of a prescribed relationship in the case when the result compared in the comparing part 38 is in $\xi_{max} > \xi'$ and the newly-established sampling point computing part 40 comprises, for example, a deviation computing part 41 and a maximum deviated position detecting part 42.

Operations of the construction-illustrated in FIG. 3 will be described hereinbelow in connection with the illustrations of FIG. 2.

First, the coordinate information at both terminal outline points $P_1$ and $P_2$ (Each of these terminal outline points corresponds to the split point D or D' of FIG. 1 obtained by the aforesaid pretreatment.) of a block B in FIG. 2A is stored in the sampling point coordinate storing part 32 as the coordinate information of the sampling points which have been preset to establish an initial condition of the operations.

When establishment of the aforesaid initial condition is completed, a distance L (fIG. 2A) between the sampling points $P_1$ and $P_2$ which have already been established and being read out from the sampling point coordinate storing part 32 is computed by the distance computing part 33 on the basis of the coordinate information of both the sampling points, and the result computed is outputted to the appreciation quantity computing part 36.

On the other hand, at the same time of the above described operation, the approximate curve computing part 34 determines an approximate curve connecting the sampling point $P_1$ with the point $P_2$ which have already been established and being similarly read out from the sampling point coordinate storing part 32 on the basis of the coordinate information of both the sampling points, and the approximate curve thus determined is outputted to the area computing part 35.

However, the present case wherein an operation is started from the initial condition involves two established sampling points so that the aforesaid approximate curve comes to be straight line $C_1$ as shown in FIG. 2A.

Then, an area $S = S' + S''$ illustrated in FIG. 2A is computed by means of the area computing part 35 on the basis of the straight line $C_1$ determined by the aforesaid approximate curve computing part 34 and the outline coordinate information stored in the outline information storing part 31, the result thus computed is outputted to the appreciation quantity computing part 36.

The appreciation quantity computing part 36 computes an appreciation quantity $\xi$ being S/L on the basis of the distance L determined by the aforesaid distance computing part 33 and the area S determined by the area computing part 35.

Since this case involves one appreciation quantity to be calculated, the above appreciation quantity is supplied to the comparing part 38 as the maximum value $\xi_{max}$ of appreciation quantity through the maximum appreciation quantity detecting part 37.

To the comparing part 38, a predetermined allowable value $\xi'$ has been given from the allowable value setting part 39 as other input so that the newly-established sampling point computing part 40 is actuated in case of $\xi_{max} > \xi'$.

The deviation computing part 41 being a component of the newly-established sampling point computing part 40 calculates deviation $\Delta$ illustrated in FIG. 2A with respect to whole the interval extending over the points $P_1-P_2$ on the basis of the curve (in this case, the same is particularly the straight line $C_1$) obtained by means of the aforesaid approximate curve computing part 34 and the outline coordinate information stored in the outline information storing part 31, and a positional information at point $P_3$ being the maximum value on the block B is determined by the maximum deviated position detecting part 42. As a result, the aforesaid point $P_3$ is stored and established in the sampling point coordinate storing part 32 as a newly-established sampling point.

As described above, when the newly-established sampling point $P_3$ is established on the outline of the block B, the construction of FIG. 3 executes again the operations as described above. Such operation processes will be described hereinbelow in conjunction with FIG. 2B. In this case, the newly-established sampling point $P_3$ is renewed as an established sampling point.

Namely, in this case, the distance computing part 33 determines first distances $L_1$ and $L_2$ illustrated in FIG. 2B. At the same time, an approximate curve $C_2$ (represented by each dotted line in FIG. 2) passing through the established sampling points $P_1$, $P_2$ and $P_3$ on the block B is determined by the approximate curve computing part 34.

The area computing part 35 computes individually areas $S_1$ and $S_2$ (indicated by slant lines in FIG. 2) enclosed by the respective outline segments cut out with sampling points as well as the aforesaid approximate curve $C_2$.

Then, appreciation quantities $\xi_1$ and $\xi_2$ relating to which $S/L = \xi$ are determined in the appreciation quantity computing part 36 on the basis of the areas $S_1$ and $S_2$ as well as the distances $L_1$ and $L_2$ corresponding thereto, respectively.

Now, in case of FIG. 2B, since a relationship between both the appreciation quantities is such that $\xi_1 > \xi_2$, value of $\xi_2$ is supplied from the maximum appreciation quantity detecting part 37 to the comparing part 38 as the maximum value $\xi_{max}$ of appreciation quantity.

In case of $\xi_{max}(=\xi_2) > \xi'$, the newly-established sampling point computing part 40 is again actuated by means of a command derived from the comparing part 38 so that the appreciation quantity at point $P_4$ at which the quantity becomes $\Delta_{max}$ similarly as described in the case of FIG. 2A is established in the sampling point coordinate storing part 32 as a newly-established sampling point.

The processing situation after the newly-established sampling point $P_4$ is determined as mentioned above is as illustrated in FIG. 2C, but the operations themselves of the construction in FIG. 3 at that time are the ones of repetition which have already been determined. Accordingly, the description therefor will be omitted hereinbelow.

And when the aforesaid comparing part 38 detects a relationship of $\xi_{max} \leq \xi'$ in such processes wherein newly-established sampling points $P_i$ are successively determined, operations of the construction illustrated in FIG. 3 relating to any one block B are completed.

Of course, it means that the sampling points $P_1$ to $P_i$ stored in the sampling point coordinate storing part 32 have been established at that time as desired sampling points concerning the outline of block B.

Furthermore, a value of the distance L in the aforesaid distance computing part 33 can very easily be determined through calculation of an equation $$L = \sqrt{(\Delta x)^2 + (\Delta y)^2}.$$

Moreover, a desired area S can be comparatively easily determined by integrating differences of two curves in y-direction towards x-direction in the aforesaid area computing part 35. Therefore, computation upon a value of the appreciation quantity $\xi$ being given as the ratio S/L as mentioned before may also be comparatively simply effected. And such appreciation quantity $\xi$ is obtained by dividing the area S by the length L so that the appreciation quantity is the one involving dimension of length. As a result, such quantity comes to be an index for indicating a discrete relationship between two curves (outline and approximate curve) defining the area S so far as these both curves do not involve a peculiar irregularity.

Figure 4:
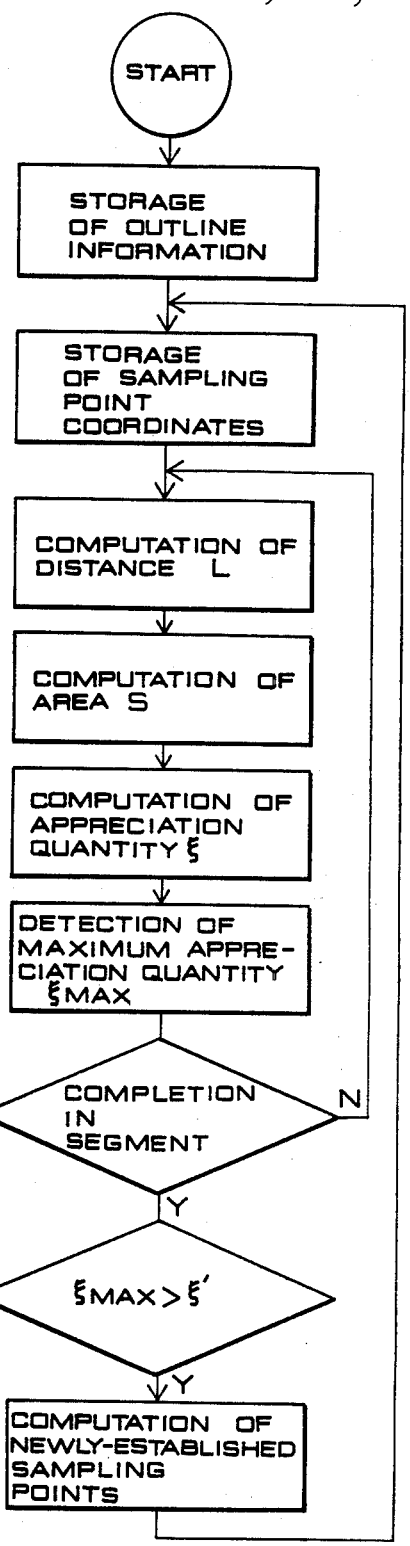
FIG. 4 is a flow chart illustrating the operational process of FIG. 3.
Figure 8:
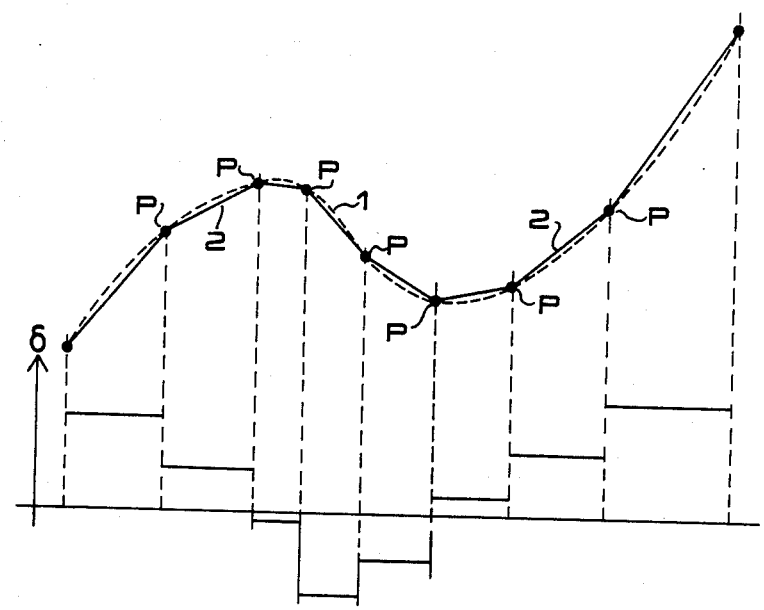
FIGS. 8 and 9 are explanatory views each illustrating a general sketch of a conventional data compressing method according to outline method.
Figure 9:
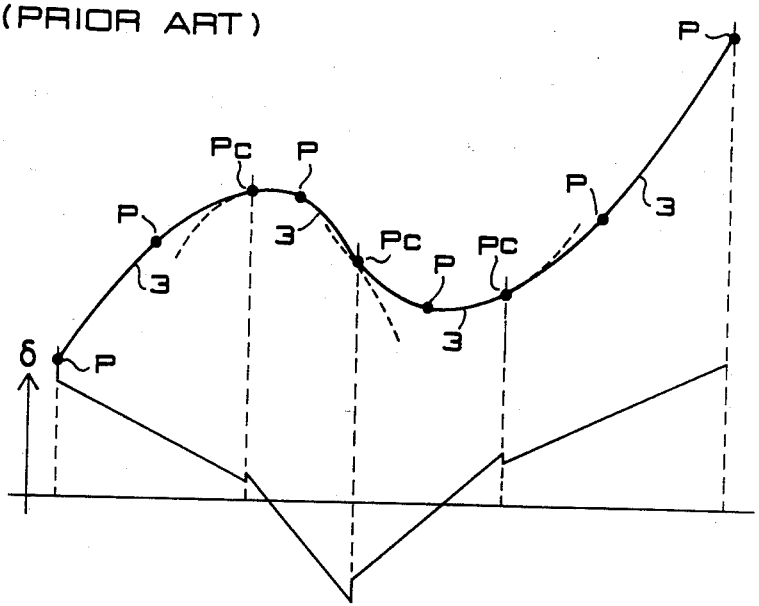
Figure 10:
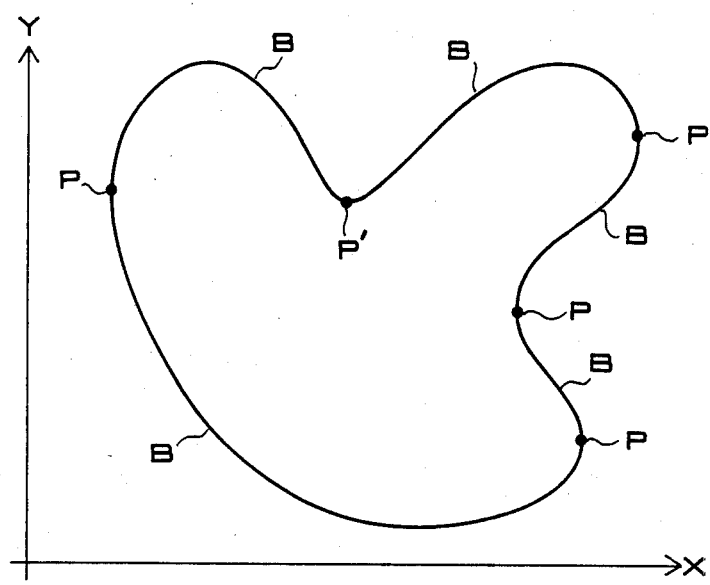
FIG. 10 is an explanatory view illustrating typically a relationship between a character outline and blocks B on X- and Y-coordinates.

FIG. 4 is a flow chart illustrating operational processes of the construction of FIG. 3.

Next, a method for establishing blocks by which the method for establishing sampling points in accordance with the construction of FIG. 3 or the processes of FIG. 4 is made more effective will be described hereinbelow in connection with a case wherein a character outline involves the peculiar irregularity as described above.

Figure 5:
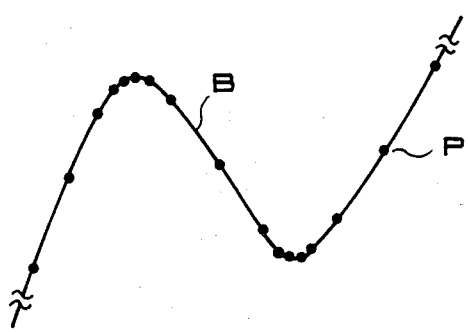
FIG. 5 is a typical explanatory view illustrating an example wherein the method for establishing sampling points in accordance with the construction of FIG. 3 or the process of FIG. 4 is effected.

Namely, when the method for establishing sampling points in accordance with the construction of FIG. 3 or the processes of FIG. 4 is practiced, there is such a tendency that sampling points P concentrate in a portion where the character outline has a small curvature radius as typically illustrated in FIG. 5. As a result, there causes such a case wherein improvement of data compressibility being dependent on the number of sampling points is prevented.

Accordingly, an improved method for establishing blocks as described hereinbelow notices a property in concentration of the aforesaid sampling points to utilize such property so that a second split point (corresponding to the split point D' in FIG. 1) is newly organized at a portion where a preset density of the sampling points exceeds a prescribed threshold to divide a block into two sections. The establishment of sampling points in accordance with the construction of FIG. 3 is again practiced with respect to the respective blocks thus divided, whereby the improved method contemplates to contribute to decrease in the number of sampling points established in the whole character outline.

An embodiment of the improved method for establishing blocks will be described hereinbelow on the basis of the illustration in FIG. 6.

Figure 6:
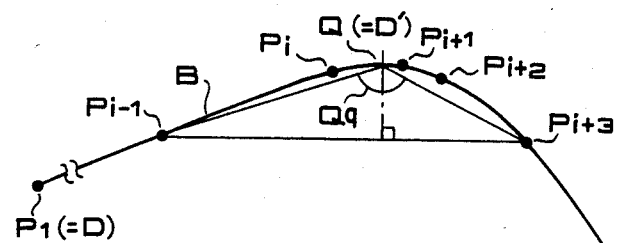
FIG. 6 is a typical explanatory view illustrating an embodiment of an improved method for establishing blocks according to the present invention.

In FIG. 6, $P_1$ and $P_n$ designate terminal outline points of any one of blocks as well as $P_{i-1}$ to $P_{i+3}$ designate sampling points determined by applying the aforesaid method for establishing sampling points to block B.

In case of practicing the improved method for establishing blocks, for example, such a value $\overline{P_i, P_{i+1}} + \overline{P_{i+1}, P_{i+2}} = \rho_i$ is first computed in respect of all the cases of i=2 to (n−3) as densities of the sampling points, and the values thus computed are compared with threshold $\rho'$, respectively.

And such a case wherein $\rho_i < \rho'$ is extracted as a concentrated interval of sampling points.

Then, the farthest point Q with respect to a straight line $\overline{P_{i-1}, P_{i+3}}$ in this concentrated interval of sampling points, that is, the interval $[P_{i-1}; P_{i+3}]$ is determined.

In addition, an angle $(P_{i-1}, Q, P_{i+3}) = \theta_q$ defined by straight lines $\overline{P_{i-1}, Q}$ and $\overline{Q, P_{i+3}}$ is determined, and then, the angle $\theta_q$ is compared with threshold $\theta'$, whereby one block is split into two blocks by adopting the point Q in the case where $\theta_q < \theta'$ as a fresh split point D'.

The improved method for establishing blocks is as mentioned above. And when the method for establishing sampling points in the construction of FIG. 3 is again applied to the respective blocks thus split into two sections, the number of sampling points decreases in the vicinity of peculiar points such as, particularly, linear intersections or an extreme end portion of so-called "hane" in Chinese or katakana character of the character outline, and as a result, it contributes to effects for data compression.

Figure 7:
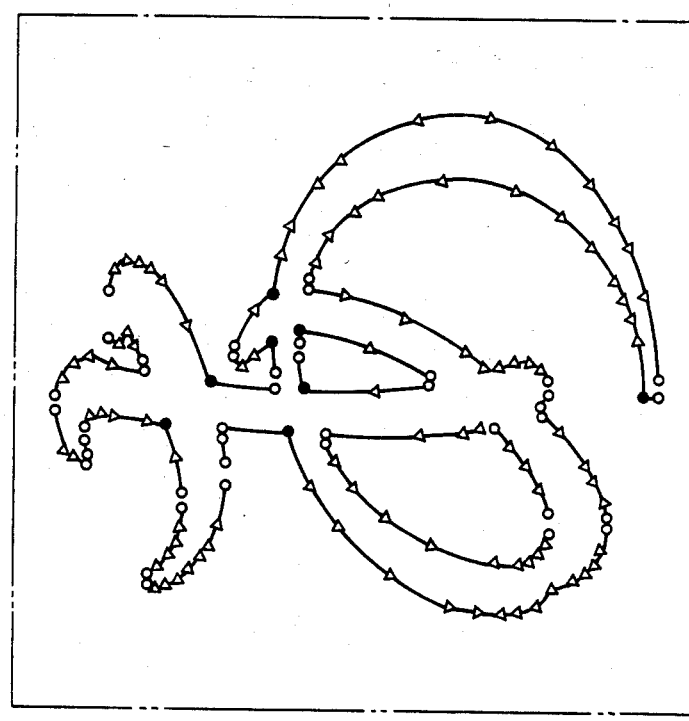
FIG. 7 is a reference view illustrating an example wherein outlines of a character are actually processed by combining the method for establishing sampling points according to the present invention with the method for establishing blocks of the invention.

One example in the case where a character outline is actually processed on the basis of the method for establishing sampling points as well as the method for establishing blocks which have been described in detail hereinbefore will be illustrated in FIG. 7 for reference.

In FIG. 7, mark "o" designates an initial split point being described in conjunction with the illustration of FIG. 1, mark "•" designates a second split point determined by means of the improved method for establishing blocks. and mark "Δ" designates a sampling point which was determined after establishing the aforesaid second split point, and in case of FIG. 7, the number of these points is 40, 9 and 99, respectively.

As fully described above, the present invention relates to a method for establishing sampling points which determines the sampling points for compressing character data on a character outline, characterized by comprising a distance computing part for computing a distance L between adjacent sampling points, respectively, in respect of the sampling points which have been previously established on the outline, an area computing part for computing area S enclosed by respective outline segments cut out by the aforesaid adjacent sampling points as well as an approximate curve obtained by connecting the respective sampling points which have previously been established on the outline with each other, an appreciation quantity computing part for computing appreciation quantity $\xi$ being a ratio S/L in respect of each segment on the basis of the distance L computed in the aforesaid distance computing part and the area S determined in the area computing part, a comparing part for comparing magnitude of the maximum value $\xi_{max}$ of the appreciation quantity determined by tne appreciation quantity computing part with that of a predetermined allowable value $\xi'$, and a newly-established sampling point computing part for computing further new sampling points on the basis of a prescribed relationship in the case when the result compared in the comparing part 38 is in $\xi_{max} > \xi'$, all the newly-established sampling points computed successively until the compared result turns to a relationship of $\xi_{max} \leq \xi'$ being established each time on the outline as desired sampling points. As a result, the present invention provides a rational method for establishing sampling points for character data compression in which one sampling point is successively established by one comparison of precision in accordance with the construction as described above.

Furthermore, the present invention relates to a character data compressing method wherein a character outline developed typically on X- and Y-coordinates is grasped as a set of blocks defined by means of a single-valued function involving x as the variable, and further the aforesaid character outline is approximated by means of a curve passing through plural sampling points established on the respective blocks. In this connection, the present invention perceives such a tendency that such sampling points concentrate at a portion at which curvature radius of the character outline is small, and the invention utilizes the above tendency. More specifically, the character data compressing method of the present invention is characterized in that density of plural sampling points established on any one of blocks is computed for each sampling point, then, a split point is newly established on a portion of concentrated sampling points at the time when the aforesaid density detects the portion of concentrated sampling points exceeding a prescribed threshold, and the aforesaid any one block is split into two blocks by means of the aforesaid split point to establish them. According to the construction as mentioned above, the present invention contributes to decrease in the number of sampling points to be established on the whole character outline so that the invention provides a method for establishing blocks which makes the aforesaid character data compressing method more effective.

Another embodiment of the method according to the present invention will be described hereinbelow.

The method of the present invention is applied to row and column matrix-form binary character data supplied from, for example, a scanner or the like. In another example, the method of the invention is applied to coded character data which can specify a row and column matrix-formed dot pattern and which may be in accordance with any method.

Namely, for instance, a character image is subjected to dot-decomposition in row and column matrix-form by means of raster scanning of a scanner to determine bit pattern data, and such bit pattern data are supplied as original character data which come to be objects to be processed in the method of the present invention.

In the method according to the present invention, first, a processing of outline extraction is effected, as the first data processing step, on the aforesaid original data supplied, and positions of the outline on X- and Y-coordinates are determined.

In this case, outline extraction from such original data which can specify original data being dot-decomposed in the aforesaid row and column matrix-form or bit patterns being dot-decomposed in the row and column matrix-form is processed by determining a dot position at which binary data corresponding to the respective decomposed dots change from "0" to "1" or from "1" to "0" in the row or column direction.

If the data relating to the position of the outline thus extracted are the ones which can specify the positions of the outline on X- and Y-coordinates, such data are sufficient for the method according to the present invention and the data having any type of storage may be utilized.

Therefore, the data may be stored in any such suitable manner that X-, Y-coordinate data in respect of the respective outline dots are stored in accordance with table type manner, that bit datum corresponding to the outline position is stored on a frame memory as "1", or the like manner.

Then, a second data processing for making the outline specified in the aforesaid first process to be a set of blocks B is practiced.

Namely, in the second process, point P is established on the outline, and the outline is split in the interval of a single-valued function involving x (row direction . . . The same shall apply hereinafter.) as the variable, whereby suitable blocks B are determined, respectively.

In this case, the establishment of the aforesaid blocks B can generally be processed by extracting an optional interval in which X-coordinate values of the respective decomposed dots on a series of outline increase or decrease monotonously as block B.

As a more specific method for establishing blocks B, there is proposed such a method wherein as illustrated in FIG. 3, decomposed dots in which X-coordinate values of the decomposed dots on a series of outlines come to be extreme values are determined, thereafter, the decomposed dots corresponding to the extreme values are utilized as initial break-points P, and further second break-points P' are established suitably on the respective outlines split by the break-points P, whereby intervals split by the respective break-points (P or P') may be employed as the blocks B, respectively.

Physical meaning of each block B thus established is in that each block B corresponds to a set of points making bright points to be scanned in Y-direction (column direction . . . The same shall apply hereinafter.) turn-on or turn-off in case of interpreting the data compressed in accordance with the method of the present invention to reproduce character image on a raster scanning type character display unit such as cathode ray tube or the like.

The method according to the present invention is the one for specifying the outline of a whole character as a set of plural blocks B determined by means of the above described second process.

And in the present invention, a third process for further splitting any one of the blocks B into a plurality of segments $S_i$ as a pretreatment for determining specifically coded data corresponding to the blocks B is practiced.

Figure 11:
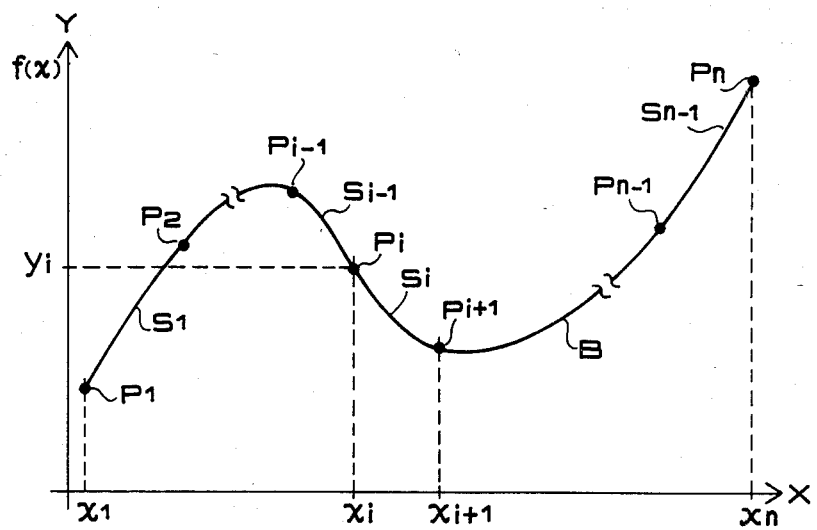
FIG. 11 is an explanatory view illustrating typically a relationship between any one block B and a segment $S_i$ on X- and Y-coordinates.

FIG. 11 is a typical graphical representation indicating a relationship between any one of the blocks B determined in the aforesaid second process and the segment $S_i$ on X- and Y-coordinates wherein points $P_1$ and $P_n$ are start point and end point, respectively.

Namely, in the third process, as indicated in FIG. 11, any one of the blocks B is delimited with (n−2) of break-points $P_i(x_i;y_i)$ where i=2 to (n−1) to determine (n−1) of segments $S_i[P_i;P_{i+1}]$ where i=1 to (n−1), and $P_i$ and $P_{i+1}$ are start and end points of the segment $S_i$, respectively, in respect of each block B.

In this case, after all, if the aforesaid break point $P_i$ has been established on a character outline corresponding to the block B, it is satisfactory as is also apparent from FIG. 11 so that the number and space for the establishment are generally arbitrary so far as they are within a range where whose character image reproducibility is allowable.

However, situations for establishing the block B and the segment $S_i$ processed in the above described second and third processes are important factors exerting directly influence upon compressibility of the character data compressed by the method according to the present invention.

In this connection, the present inventors have made also the invention in respect of preferred methods for establishing these blocks B and the segments $S_i$ as mentioned hereinbefore.

Meanwhile, when attention is paid to FIG. 11, besides an m-order curve passing through each start point $P_i(x_i:y_i)$ of $(n-1)$ of the aforesaid segments $S_i$ is imagined, the curve is specified by the following equation:

$$f_i(x) = y_i + \sum_{j=1}^{m} A_{i,j}(x - x_i)^j \quad (1)$$

Accordingly, if all the values of effective coefficient $A_{i,j}$ where $i=1$ to $(n-1)$, and $j=1$ to $m$, in the segment $S_i$ of the interval $(x_i$ to $X_{i+1})$ have previously been determined in accordance with any method, a y-coordinate value in a range $(x_1-x_n)$ corresponding to any one block B can be successively computed from the above equation (1). Furthermore, it becomes possible to approximate the y-coordinate value thus computed as y-coordinate value of a desired character outline in the aforesaid range $(x_1$ to $x_n)$ of block B.

In the following description, an embodiment wherein each segment $S_i$ is made to be approximated by means of the following third-order curve where $m=3$:

$$f_i(x) = y_i + b_i(x - x_i) + c_i(x - x_i)^2 + d_i(x - x_i)^3 \quad (2)$$

will be described.

Now, in the case where $m=3$, three unknown coefficients $b_i$, $c_i$ and $d_i$ exist in respect of each segment $S_i$. As a result, $3(n-1)$ of unknown coefficients exist with respect to any one of the blocks B consisting of $(n-1)$ of the aforesaid segments $S_i$.

Accordingly, in the case where the aforesaid unknown coefficients required for approximating the character outline in any one block B have been determined beforehand, $3(n-1)$ of relational expressions are needed, even if any method is adopted.

Meantime, an outline of character, pictorial image or the like possesses, as mentioned already, the following general properties such that (1) the outline itself is naturally continuous, besides (2) primary derived function of the outline (inclination of the outline) varies continuously, and (3) secondary derived function of the outline (rate of change of the inclination) also varies continuously.

Under the circumstances, in the method according to the present invention, attention is paid to the several properties (1)–(3) involved in the outline of a character, pictorial image or the like, besides such attention is also paid to such a fact that these several properties can afford some of the relational expressions required as described above.

Namely, the following three relational expressions:

$$\left.\begin{array}{l} f_{i-1}(x_i) = f_i(x_i) \\ f_{i-1}'(x_i) = f_i'(x_i) \\ f_{i-1}''(x_i) = f_i''(x_i) \end{array}\right\} \quad (3)$$

are given as a condition by which the adjacent two segments $S_{i-1}$ and $S_i$ satisfy the aforesaid properties (1)–(3), respectively, in the aforesaid optional one break-point $P_i(x_i:y_i)$.

In this case, the number of break-points $P_i$ is, as mentioned above, $(n-2)$ in total in case of $i=2-(n-1)$ so that after all, $3(n-2)$ of relational expressions can be obtained from the aforesaid properties of character outline.

Furthermore, in the method according to the present invention, for example, the following three relational expressions;

$$\left.\begin{array}{l} f_{n-1}(x_n) = y_n \\ f_1'''(x_1) = C_1'''(x_1) \\ f_{n-1}'''(x_n) = C_n'''(x_n) \end{array}\right\} \quad (4)$$

where $C_1(x)$ and $C_n(x)$ are three-order equations passing through points $P_1$, $P_2$, $P_3$ and $P_4$, and points $P_{n-3}$, $P_{n-2}$, $P_{n-1}$ and $P_n$, respectively, are given as a boundary condition at the start point $P_1$ and the end point $P_n$ in the block B.

As described above, it is arranged in the method according to the present invention that $3(n-1)$ in total of relational expressions are given on the basis of the properties of character outline and a boundary condition at the both ends of block B.

Consequently, as mentioned above, when simultaneous equations being composed of these expressions are solved, the aforesaid $(n-1)$ sets of unknown coefficients $b_i$, $c_i$ and $d_i$ can be determined, and the solution thereof is as follows:

$$\left.\begin{array}{l} b_i = (y_{i+1} - y_i)/h_i - h_i(\sigma_{i+1} + 2\sigma_i) \\ c_i = 3\sigma_i \\ d_i = (\sigma_{i+1} - \sigma_i)/h_i \end{array}\right\} \quad (5)$$

where $$\sigma_i = (\beta_i - h_i \cdot \sigma_{i+1})/\alpha_i \quad (6),$$

and value of the aforesaid $\sigma_i$ is as follows:

$\sigma_n = \beta_n/\alpha_n$ $h_i = x_{i+1} - x_i$ $\beta_1 = h_1^2 \cdot \Delta^{(3)}_1$ $\beta_i = (\Delta_i - \Delta_{i-1}) - h_{i-1} \cdot \beta_{i-1}/\alpha_{i-1}$ $\beta_n = -h_{n-1}^2 \cdot \Delta^{(3)}_{n-3} - h_{n-1} \cdot \beta_{n-1}/\alpha_{n-1}$ $\alpha_1 = -h_1$ $\alpha_i = 2(h_{i-1} + h_i) - h_{i-1}^2/\alpha_{i-1}$ $\alpha_n = -h_{n-1} - h_{n-1}^2/\alpha_{n-1}$ $$\Delta_i = (y_{i+1} - y_i)/h_i$$

$$\Delta^{(2)}{}_i = (\Delta_{i+1} - \Delta_i)/(x_{i+2} - x_i)$$

$$\Delta^{(3)}{}_i = (\Delta^{(2)}{}_{i+1} - \Delta^{(2)}{}_i)/(x_{i+3} - x_i).$$

Accordingly, in the method according to the present invention, values of unknown coefficients $b_i$, $c_i$ and $d_i$ have previously been computed from the aforesaid equation (5) as a forth data processing step, and the coefficients thus computed as well as coordinates $(x_i, y_i)$ of points $P_i$ defining respective segments $S_i$ are stored as compressed, coded data corresponding to the aforesaid blocks B.

Of course, interpretation of these compressed data, that is, reproduction of the character image is practiced by operating values of $f_i(x)$ in the equation (2) in respect of the segments $S_i$ corresponding to arbitrary x-coordinate values.

In this case, such outline determined by means of values in accordance with the aforesaid operation is the one in which the outline itself is not only continuous, but also primary derived function (inclination of the outline) as well as secondary derived function (rate of change of the inclination) of the aforesaid outline change continuously so that such an output being more approximate to a natural character image can be obtained.

Figure 12:
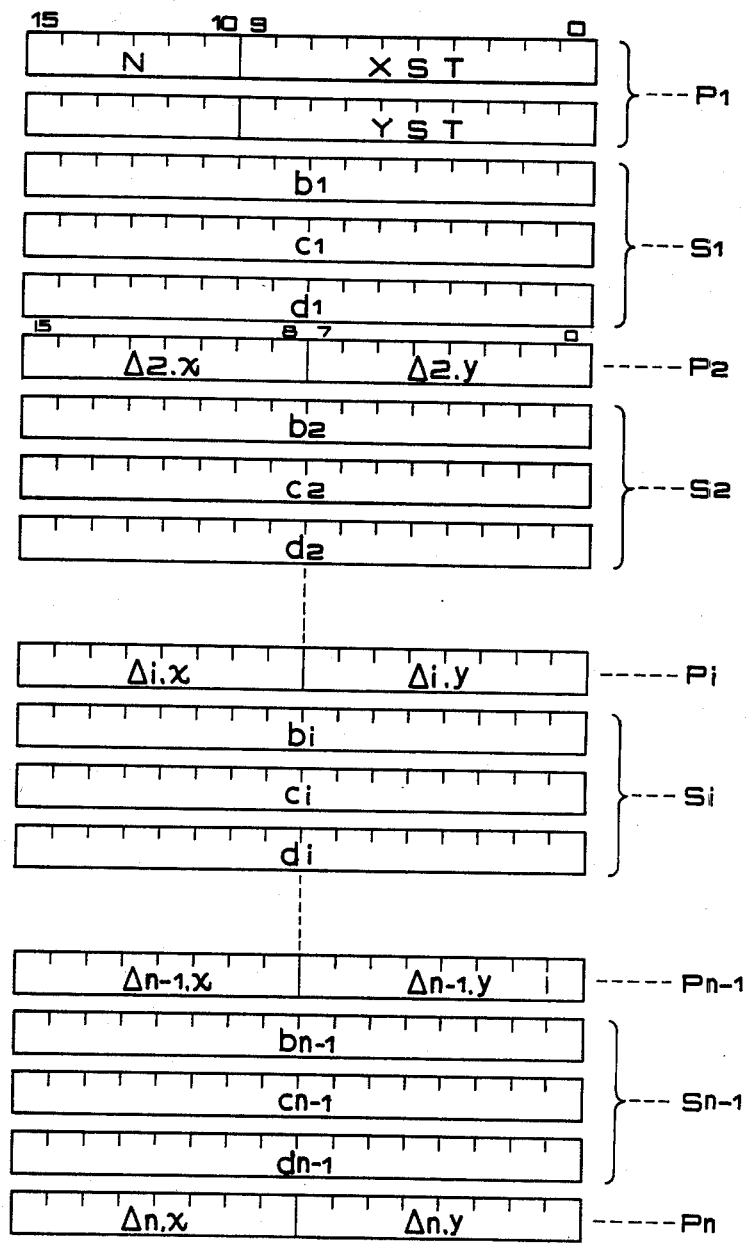
FIG. 12 is a view showing an example of a preferred data memory format utilized in case of effecting the method according to the present invention.

FIG. 12 is a view for illustrating one example of a preferred data memory format which is utilized in case of practicing the method according to the present invention as described above wherein N is the number of break-points $P_i$ existing in any one of blocks, XST and YST indicate X- and Y-coordinate values of start point $P_1$ in any one block, $\Delta_{i,x}$ and $\Delta_{i,y}$ are differences along X- and Y-directions between two adjacent points $P_i$ and $P_{i-1}$, respectively, and coordinates of an arbitrary break-point $P_i$ are successively specified by means of these differences.

The data compression method as mentioned above is the one which relates to a method for storing coefficients $b_i$, $c_i$ and $d_i$ as a part of compression data.

In view of the above, another method in which data other than the above described coefficients are stored will be described hereinbelow.

First of all, as a premise of the explanation, when secondary derived function of the aforesaid equation (2) concerning each segment $S_i$ is determined, it is expressed by the following equation:

$$f_i''(x) = 2c_i + 6d_i(x - x_i) \quad (7).$$

As a consequence, a value of the secondary derived function in the start point $P_i$ $(x_i, y_i)$ for segment $S_i$ is as follows:

$$f_i''(x_i) = 2c_i = \text{constant} \quad (8).$$

In this connection, $\sigma_i$ in the aforesaid equation (6) is such a constant possessing the following property being derived from the aforesaid equations (5) and (8):

$$\sigma_i = 2c_i/6 = (\text{value of secondary derived function in the start point } P_i \text{ of the segment } S_i)/6.$$

Accordingly, in the other method according to the present invention, a value of $\sigma_i$ possessing such property as mentioned above has previously been computed as the fourth data processing step, and the constant $\sigma_i$ thus computed as well as coordinates $(x_i, y_i)$ of points $P_i$ defining respective segments $S_i$ are stored as compressed, coded data corresponding to the aforesaid blocks B.

Interpretation of these compressed data is practiced by operating values of $f_i(x)$ from the aforesaid equations (5) and (2) in respect of the segments $S_i$ corresponding to arbitrary x-coordinate values.

Of course, in also this case, primary and secondary derived functions of outline vary continuously so that a natural character image is reproduced and outputted similarly as in the case where the aforesaid coefficients are utilized as the compression data.

On one hand, in case of the latter method where the constant $\sigma_i$ is stored, an additional operation of the equation (5) must be executed in case of interpreting compression data as mentioned above.

Therefore, it is inevitable that a period for reproducing character image becomes longer than that of the former method in which coefficients are directly stored. On the other hand, however, it is sufficient to store only one constant for the latter method unlike the former method which requires to store three coefficients. Hence, the latter method has been further improved as compared with the former method in view of data compressibility.

Figure 13:
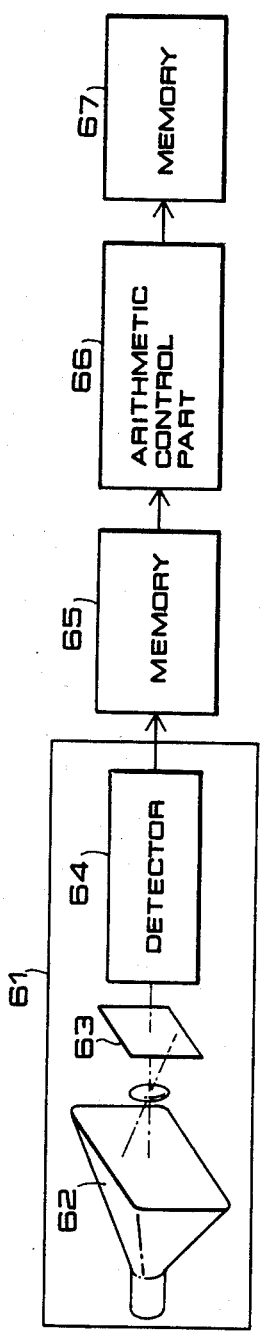
FIG. 13 is a schematic view illustrating a constructional example for determining memory data by the method according to the present invention.

FIG. 13 is a schematic view illustrating a constructional example for determining the memory data as described above wherein reference numeral 61 designates a scanner for determining row and column matrix-formed binary data corresponding to two-dimensional character image. The scanner 61 is arranged in such that transmitted light or reflected light from a character image pattern 63 being irradiated by means of scanning light from, for example, a flying-spot tube 62 is detected by a detector 64, and the signal detected is subjected to restoration sampling, whereby desired binary data are determined.

Reference numeral 65 designates a memory for once storing original binary data determined in the scanner 61. Reference numeral 66 designates an arithmetic control part wherein the aforesaid binary data supplied in accordance with online or batch processing are subjected to data processing to output desired memory data to a compressed data memory 67, and it is preferable that such arithmetic control part is generally constructed by means of electronic computer.

Principal processing order in the aforesaid arithmetic control part 66 is as follows.
(1) Input of original binary data
(2) Extraction of outline
(3) Establishment of block B
(4) Establishment of segment $S_i$
(5) Computation of desired memory data
(6) Output of memory data.

As a result of an examination wherein the character or pictorial image data compression method according to the present invention as described hereinbefore is applied to one of Japanese characters "あ" being composed of $800 \times 800$ dots, if allowable error with respect to a desired character image is assumed to be 1 dot, data compressibilities 1.385% and 0.75% could be obtained in the former method for storing coefficients and the latter method for storing constant $\sigma_i$, respectively.

Next, such a case in which character images of various scale factors are reproduced on the basis of memory data obtained by the character or pictorial image compressing method as mentioned hereinbefore will be described hereunder.

Figure 14:
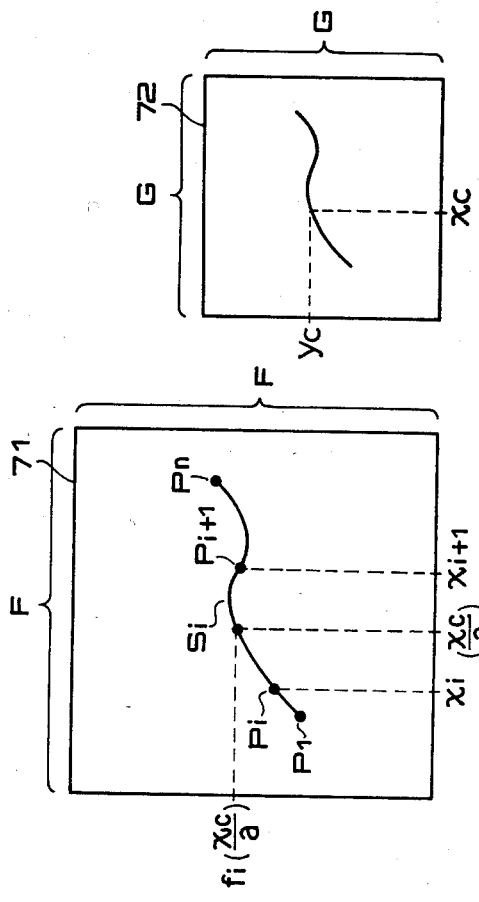
FIG. 14 is an explanatory view illustrating a relationship between a master font and an output character area.

FIG. 14 is an explanatory view indicating a relationship between a master font 71 composed of FXF dots and an output character area 72 composed of GXG dots wherein output character image is outputted to the master font 71 with scale factor of a=G/F times. Accordingly, x-coordinate value $X_c$ on the output character area 72 corresponds to $X_c/a$ on the master font 71.

For this reason, first, a segment $S_i$ which comes to be $x_i \leq (X_c/a) \leq x_{i+1}$ on the master font 71 is specified, and a value of $y_c = a \cdot f_i(X_c/a)$ is determined from the aforesaid equation (2) on the basis of memory data relating to the segment $S_i$ thus specified, whereby y-coordinate value $y_c$ of the character outline corresponding to X-coordinate $X_c$ on the output character area 72 can be determined.

The character image thus reproduced on the output character area 72 is formed by multiplying the value determined from the aforesaid equation (2) by a constant of proportionality (scale factor a) so that such reproduced image being always proportional to the master font is obtained irrespective of extent of the scale factor. Accordingly, even if it is in such a case where a character having a larger size than that of the character image specified on the master font 71 is outputted, smoothness of the outline can be maintained.

Furthermore, different points of the method according to the present invention from those of conventional m-order curve approximating method reside in that the conventional method utilizes only coordinate values of the points established on a character outline as whose memory data, and contemplates to approximate the outline by means of the m-order curve specified by points of optionally continuous (m+1), whilst the method of the present invention utilizes also additional information other than point coordinate values, and contemplates to approximate an interval between optionally adjacent two points by means of m-order curve. In addition, the aforesaid additional information is the one which is determined to make a connecting condition for two segments at both the ends of an arbitrary break-point consistent with properties of whose character image so that the method according to the present invention makes possible to reproduce the character image which is far closer to whose desired character image as mentioned above.

As fully described hereinbefore, the present invention relates to a method for compressing character or pictorial image data which contemplates to compress a quantity of data by storing outline specifying information of the character, pictorial image or the like, characterized by comprising a first step for determining positions of the outline of the character, pictorial image or the like on X- and Y-coordinates; a second step for splitting the aforesaid outline into blocks of a single-valued function involving x as the variable to make the aforesaid outline to be a set of plural blocks; a third step for delimiting any one of the blocks with (n−2) of break-points $P_i$ to obtain (n−1) of segments $S_i$; and a fourth step for computing (n−1) sets of coefficient $A_{i,j}$ in respect of an m-order curve:

$$f_i(x) = y_i + \sum_{j=1}^{m} A_{i,j}(x - x_i)^j$$

passing through start points $P_i$ ($x_i$:$y_i$) of the aforesaid respective segments $S_i$; the aforesaid coefficients as well as coordinate values of the points $P_i$ defining the aforesaid respective segments $S_i$ being stored as the outline data corresponding to the aforesaid blocks; and at the same time, simultaneous equations composed of 3 (n−1) of relational expressions obtained by a continuous condition at (n−2) of the aforesaid break-points $P_i$ and a boundary condition at both terminal outline points $P_1$ and $P_n$ in the block being solved thereby to determine prescribed memory data.

Furthermore, the present invention relates to a method for compressing character or pictorial image data, characterized by comprising the aforesaid first, second and third steps as well as another fourth step, in place of the aforesaid fourth step, for computing a constant $\sigma_i$ corresponding to 1/6 a value of secondary derived function at each start point $P_i$ ($x_i$:$y_i$) in respect of a three-order curve passing through the start points of the aforesaid respective segments; and the aforesaid constant $\sigma_i$ as well as coordinate value of the points $P_i$ defining the aforesaid respective segments $S_i$ being stored as outline data corresponding to the aforesaid blocks.

According to the constructions as mentioned above, the present invention provides a method for compressing character or pictorial image data in which smoothness of a character outline is faithfully stored, whilst a sufficiently high data compressibility can be obtained.

What is claimed is:

1. A method for establishing new sampling points with respect to previously established sampling points which determines said new sampling points for compressing character data on a character outline comprising:

a distance computing part for computing a distance L between adjacent sampling points, respectively, in respect of said sampling points which have been previously established on the outline;

an area computing part for computing area S enclosed by respective outline segments cut out by said adjacent sampling points as well as an approximate curve obtained by connecting said respective sampling points which have previously been established on said outline with each other;

an appreciation quantity computing part for computing appreciation quantity $\xi$ being a ratio S/L in respect of each segment on the basis of said distance L computed in said distance computing part and said area S determined in said area computing part;

a computing part for comparing magnitude of the maximum value $\xi_{max}$ of the appreciation quantity determined by said appreciation quantity computing part with that of a predetermined allowable value $\xi'$; and a newly-established sampling point computing part for computing further new sampling points on the basis of a prescribed relationship in the case when the result compared in said comparing part is in $\xi_{max} > \xi'$;

all the newly-established sampling points computed successively until the compared result turns to a relationship of $\xi_{max} \leq \xi'$ being established each time on said outline as desired sampling points.

2. A method for establishing blocks for compressing character data wherein a character outline developed typically on X- and Y-coordinates is grasped as a set of blocks defined by means of a single-valued function involving x as the variable, and further said character outline is approximated by means of a curve passing through plural sampling points established on said respective blocks, which comprises:

computing density of plural sampling points established on any one of blocks for each sampling point;

establishing newly a split point on a portion of concentrated sampling points at the time when said density detects the portion of concentrated sampling points exceeding a prescribed threshold: and splitting said any one block into two blocks by means of said split point.

3. A method for establishing blocks for compressing character data as claimed in claim 2, wherein the farthest point Q with respect to a straight line $\overline{P_{i-1}, P_{i+3}}$ is determined in the case when a value $\overline{P_i, P_{i+1}} + \overline{P_{i+1}, P_{i+2}} = \sigma_i$ where i=2 to (n−3), is smaller than a prescribed threshold $\sigma'$, if the sampling points established on said any one block are $P_i$ where i=1 to n, and $P_1$ and $P_n$ are start and end points of said block, respectively; and furthermore, said point Q is utilized for a desired split point to be newly established in the case where an angle $(P_{i-1}, Q, P_{i+3}) = \theta_q$ defined by straight lines $\overline{P_{i-1}, Q}$ and $\overline{Q, P_{i+3}}$ is smaller than a prescribed value $\theta'$.

4. A method for compressing character or pictorial image data which contemplates to compress a quantity of data by storing outline specifying information of said character, pictorial image or the like comprising:

a first step for determining positions of the outline of said character, pictorial image or the like on X- and Y-coordinates;

a second step for spliting said outline into blocks $[P_1:P_n]$:

where $P_1$ and $P_n$ are start and end points of any one block, respectively, of a single-valued function involving x as the variable to make said outline to be a set of plural blocks;

a third step for delimiting any one of said blocks with (n−2) of break-points $P_i$ ($x_i$:$y_i$): where i=2 to (n−1), to obtain (n−1) of segments $S_i$: where i=1 to (n−1); and a fourth step for computing (n−1) sets of coefficient $A_{i,j}$: where j=1 to m, in respect of an m-order curve:

$$f_i(x) = y_i + \sum_{j=1}^{m} A_{i,j}(x - x_i)^j$$

passing through start points $P_i$ ($x_i$:$y_i$) of said respective segments $S_i$;

said coefficient $A_{i,j}$ as well as coordinate values ($x_i$:$y_i$): where i=1 to n, of said points $P_i$ defining said respective segments $S_i$ being stored as the outline data corresponding to said blocks.

5. A method for compressing character or pictorial image data as claimed in claim 4, wherein (n−1) sets of coefficients $b_i$, $c_i$, and $d_i$ relating to a three-order curve:

$$f_i(x) = y_i + b_i(x - x_i) + c_i(x - x_i)^2 + d_i(x - x_i)^3$$

are computed in said fourth step; and the values of said coefficients $b_i$, $c_i$ and $d_i$ thus computed are stored as said coefficient $A_{i,j}$.

6. A method for compressing character or pictorial image data as claimed in claim 5, wherein simultaneous equations composed of 3 (n−1) of relational expressions obtained by a continuous condition at (n−2) of said break-points $P_i$ and a boundary condition at both terminal outline points $P_1$ and $P_n$ in the block are solved in said fourth step, whereby said (n−1) sets of the coefficients $b_i$, $c_i$, and $d_i$ are determined.

7. A method for compressing character or pictorial image data as claimed in claim 6, wherein said values of the coefficients $b_i$, $c_i$, and $d_i$ have the following relationship:

$$b_i = (y_{i+1} - y_i)/h_i - h_i(\sigma_{i+1} + 2\sigma_i)$$

$$c_i = 3\sigma_i$$

$$d_i = (\sigma_{i+1} - \sigma_i)/h_i$$

where $h_i = x_{i+1} - x_i$, and $\sigma_i$ = constant.

8. A method for compressing character or pictorial image data which contemplates to compress a quantity of data by storing outline specifying information of said character, pictorial image or the like comprising:

a first step for determining positions of the outline of said character, pictorial image or the like on X- and Y-coordinates;

a second step for spliting said outline into blocks $[P_1:P_n]$:

where $P_1$ and $P_n$ are start and end points of any one block, respectively, of a single-valued function involving x as the variable to make said outline to be a set of plural blocks;

a third step for delimiting any one of said blocks with (n−2) of break-points $P_i$ ($x_i$:$y_i$): where i=2 to (n−1), to obtain (n−1) of segments $S_i$: where i=1 to (n−1); and a fourth step for computing a constant $\sigma_i$ corresponding to 1/6 a value of secondary derived function at said respective start points $P_i$ ($x_i$:$y_i$) in respect of a three-order curve passing through said start points of said respective segments $S_i$;

said constant $\sigma_i$ as well as coordinate values ($x_i$:$y_i$):

where i=1 to n, of said points $P_i$ defining said respective segments $S_i$ being stored as the outline data corresponding to said blocks.

9. A method for compressing character or pictorial image data as claimed in claim 8, wherein value of said constant $\sigma_i$ has the following relationship:

$$\sigma_i = (\beta_i - h_i \cdot \sigma_{i+1})/\alpha_i$$

where $$\sigma_n = \beta_n/\alpha_n$$

$$h_i = x_{i+1} - x_i$$

$$\beta_1 = h_1^2 \cdot \Delta^{(3)}_1$$

$$\beta_i = (\Delta_i - \Delta_{i-1}) - h_{i-1} \cdot \beta_{i-1}/\alpha_{i-1}$$

$$\beta_n = -h_{n-1}^2 \cdot \Delta^{(3)}_{n-3} - h_{n-1} \cdot \beta_{n-1}/\alpha_{n-1}$$

$$\alpha_1 = -h_1$$

$$\alpha_i = 2(h_{i-1} + h_i) - h_{i-1}^2/\alpha_{i-1}$$

$$\alpha_n = -h_{n-1} - h_{n-1}^2/\alpha_{n-1}$$

$$\Delta_i = (y_{i+1} - y_i)/h_i$$

$$\Delta^{(2)}_i = (\Delta_{i+1} - \Delta_i)/(x_{i+2} - x_i)$$

$$\Delta^{(3)}_i = (\Delta^{(2)}_{i+1} - \Delta^{(2)}_i)/(x_{i+3} - x_i).$$

* * * * *

UNITED STATES PATENT AND TRADEMARK OFFICE
CERTIFICATE OF CORRECTION

PATENT NO. : 4,542,412
DATED : September 17, 1985
INVENTOR(S) : SHIGERU FUSE, ET AL.

It is certified that error appears in the above-identified patent and that said Letters Patent is hereby corrected as shown below:

IN THE CLAIMS

Claim 3, line 5, delete "$\sigma$", insert --$\rho$--.

line 6, delete "$\sigma$", insert --$\rho$--.

Signed and Sealed this

Thirty-first Day of December 1985

[SEAL]

Attest:

DONALD J. QUIGG

Attesting Officer   Commissioner of Patents and Trademarks